Sept. 3, 1957      E. DOMINGO ET AL      2,804,773
TEMPERATURE SENSING DEVICES
Filed Sept. 19, 1955

INVENTORS.
EMIL DOMINGO AND
FERDINAND L. PERAGALLO
BY
*Montgomery*
ATTORNEY

United States Patent Office 2,804,773
Patented Sept. 3, 1957

2,804,773

TEMPERATURE SENSING DEVICES

Emil Domingo, New York, N. Y., and Ferdinand L. Peragallo, Oakland, N. J., assignors to Henze Instrument and Valve Inc., Hoboken, N. J., a corporation of New Jersey Application September 19, 1955, Serial No. 535,126

9 Claims. (Cl. 73—368.4)

This invention relates generally to temperature sensing devices, and more particularly to improvements in devices for sensing the temperature of a fluid mass within a container.

While the present invention has manifold applications and may take several forms, it will be described in connection with the sensing of the temperature of a fluid within a pipe or the like, such as practiced in the pasteurizing of milk.

Heretofore, temperature sensing devices have been proposed, for example, as in the application for United States Letters Patent, Serial No. 504,478, filed April 28, 1955, by Emil Domingo and Ferdinand L. Peragallo, that include a bulb arrangement defining a continuous annular space extending circumferentially around a pipe carrying a fluid mass and adapted to receive the temperature responsive medium, with such space being defined, at the radially inner side thereof, either by the pipe wall itself or by an extension of the pipe wall having the same inner diameter as the latter and interposed between adjacent ends of successive pipe sections, so that the interior of the pipe is completely smooth and unobstructed and any changes in the temperature of the fluid mass within the pipe are transmitted directly through the pipe wall or extension thereof to the temperature responsive medium within the bulb arrangement.

The above described temperature sensing devices avoid many of the disadvantages of the usual temperature sensing devices for use with milk pasteurizing apparatus which include a bulb containing a temperature responsive medium extending radially into a pipe of the apparatus, for example, the "holding" tube of a "high temperature-short time" pasteurizing apparatus. With the usual devices, the bulb extending radially into the pipe forms an obstruction which must be made removable in order to permit cleaning of the associated pipe by the circulation of cleaning and sterilizing solutions and sponge scrubbing pads through the pipe system. However, when the usual radially extending bulb is made removable from the associated pipe, the possibility exists that an unscrupulous or dishonest operator may remove the thermometer bulb from the pipe during the pasteurizing process and place the bulb in a pail or the like containing water heated to the prescribed temperature for pasteurization while the temperature in the pipe, and to which the milk is subjected, is substantially less than that prescribed temperature so that the recordings of the temperatures during pasteurization, examined by the governmental authorities having jurisdiction over such matters, will be falsified and milk may be marketed that has not been properly pasteurized. The temperature sensing devices disclosed in the above identified application for Letters Patent and described briefly hereinabove do not restrict or obstruct the interior of the pipe so that such devices can be fixed, as by welding, to the associated pipe or, when removed, arranged to leave a gap in the pipe system, whereby the possibility of falsifying the temperature recordings during the pasteurizing process is positively avoided.

However, it has been found that, in the proposed temperature sensing devices, particularly of the kind wherein the annular space receiving the temperature responsive medium is defined, at the radially inner side, by an extension of the pipe wall interposed between the adjacent ends of successive pipe sections and, at the radially outer side, by a larger diameter section of pipe integral, at one end, with the extension of the pipe wall and axially coextensive with that extension, the machining of the axially deep and radially narrow annular space from the wall of a cylindrical metal shell presents difficult practical problems.

Accordingly, it is an object of the present invention to provide an easily fabricated temperature sensing device adapted to contain a temperature responsive medium and which can be secured in place in the wall of a fluid container, such as a tank, valve housing or the like, or interposed between two adjacent pipe sections to form a continuation thereof.

In accordance with this invention as applied to the sensing of the temperature of a fluid in a pipe line, the above, and other objects, features and advantages thereof appearing in the following detailed description of an illustrative embodiments are achieved by providing a temperature sensing device that includes a cylindrical member having a relatively thick central portion the inner diameter of which is equal to that of the pipe sections between which the device is to be interposed. Axial bores are drilled in the thick central portion of the cylindrical member and open at one end edge of the central portion, with one of such bores communicating with a nipple by which that bore can be connected to a recording thermometer or the like. The end edge of the thick central portion at which the axial bores open has an annular groove therein communicating with the several bores, and a ring member is welded to the cylindrical member against the grooved end edge of the thick central portion so that the several axial bores and communicating annular groove combine to define a space for containing a temperature responsive medium to which changes in the temperature of a fluid mass within the associated pipe are directly transmitted through the parts of the cylindrical member in the regions of the axial bores.

In order that the invention may be fully understood, an illustrative embodiment thereof is hereinafter desribed in detail with reference to the accompanying drawing forming a part hereof and wherein.

Figure 1:
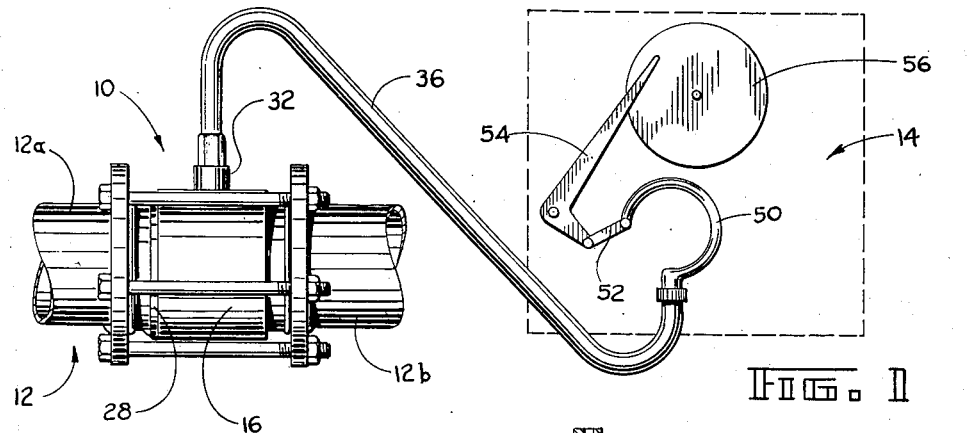
Fig. 1 is a schematic elevational view of a temperature sensing device associated with a pipe in accordance with the present invention.

Referring to the drawing in detail, and initially to Fig. 1 thereof, a temperature sensing device embodying the present invention is there shown and generally identified by the reference numeral 10. The temperature sensing device 10 responds to the temperature of a fluid mass within an associated pipe 12 and actuates any conventional device 14 to which it is connected. The device 14, which may be positioned at a distance from the sensing device 10, can, as shown in the drawing, be a temperature recording instrument providing a continuous written record of the temperature of the fluid mass contained within the pipe 12, or the device 14 may be in the form of a meter visually indicating the temperature or a control for varying the rate of fluid flow through the pipe, or some other operating characteristic, in response to changes in the temperature of the fluid mass.

Figure 2:
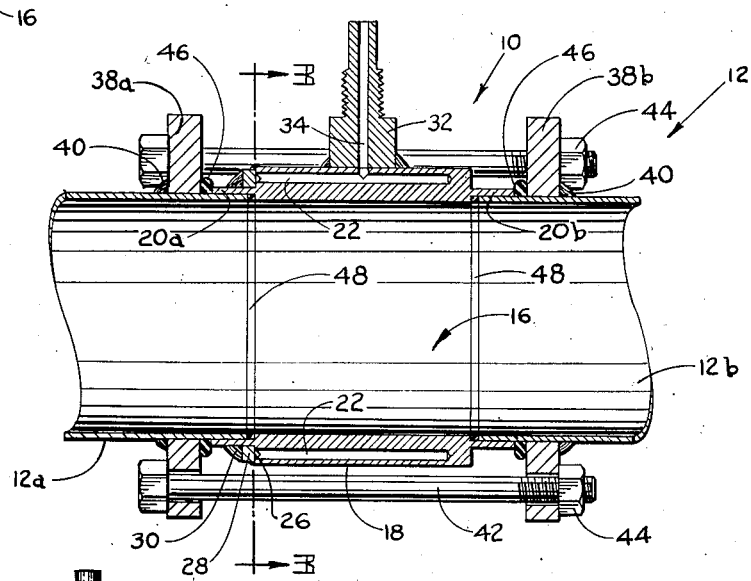
Fig. 2 is an enlarged axial sectional view of the temperature sensing device embodying this invention and shown interposed between adjacent ends of sections of the associated pipe.
Figure 3:
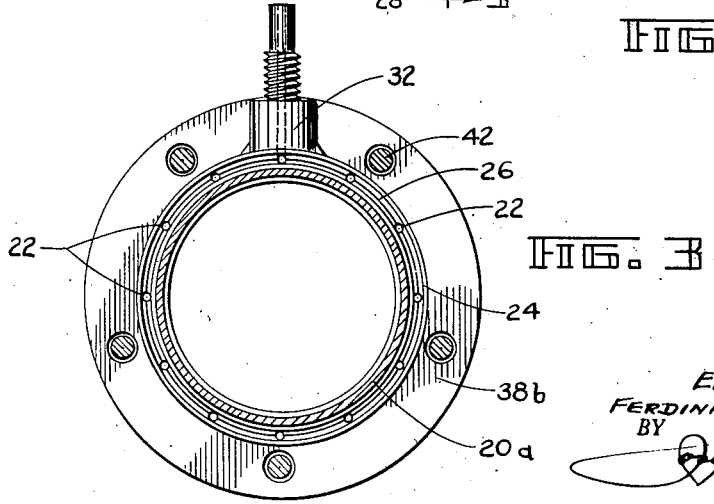
Fig. 3 is a transverse sectional view taken along the line 3—3 of Fig. 2.

Referring to Figs. 2 and 3 of the drawing, it will be seen that the temperature sensing device 10, in accordance with this invention, includes a cylindrical member 16 adapted to be interposed between the adjacent ends of sections 12a and 12b of the pipe 12 handling a fluid mass. The cylindrical member 16 over a substantial portion 18 of its length, has an internal diameter that is the same as that of the pipe sections 12a and 12b, while the thickness of that portion 18 of the member 16 is substantially greater than the thickness of the pipe sections. At the opposite ends of the thick portion 18, the cylindrical member 16 is provided with axially extending, annular rims 20a and 20b which are relatively thin (Fig. 2) and adapted to telescope over the adjacent ends of the pipe sections 12a and 12b, respectively.

The thick portion 18 of cylindrical member 16 has a circumferentially spaced apart series of axially extending blind bores 22 drilled therein and opening axially at one end face of the portion 18, for example, at the end face 24 of portion 18 disposed radially outside of the rim 20a, as shown in Figs. 2 and 3. Further, the end face 24 of the thick portion 18 is formed with an annular groove 26 that intercepts the open ends of the bores 22, and a ring member 28 slips over the rim 20a and is welded against the end face 24, as at 30 (Fig. 2), to seal the internal bores of the member 16 while the groove 26 establishes communication between the several bores 22.

An adapter or nipple 32 is welded, or otherwise secured, on the outside of cylindrical member 16 and has an internal bore 34 (Fig. 2) communicating, at its inner end, with one of the bores 22 and opening, at its outer end, into a capillary tube 36 (Fig. 1) leading from the sensing device 10 to the associated recording, indicating or controlling device 14.

As seen in Fig. 2, the pipe sections 12a and 12b are held axially together, with the member 16 therebetween, by a coupling structure that includes radial flanges 38a and 38b secured, as by welding 40 or the like, on the outside of the pipe sections 12a and 12b, respectively, adjacent the confronting ends of the latter, and tie bolts 42 extending axially through aligned openings in the flanges 38a and 38b and receiving securing nuts 44 for drawing together the flanges, with sealing rings 46 being interposed between the flanges 38a and 38b and the rims 20a and 20b, respectively, and sealing rings 48 being interposed between the end edges of the pipe sections 12a and 12b and the annular shoulders defined at the opposite ends of the thick portion 18 radially inward of the rims 20a and 20b. Thus, as the nuts 44 are tightened on the bolts 42, the sealing rings 46 and 48 are compressed to prevent any leakage of the fluid mass from the pipe 12 at the joints between the temperature sensing device 10 and the pipe sections 12a and 12b.

The bores 22, in communication with each other through the groove 26, are adapted to contain a temperature responsive medium, for example, a highly volatile fluid, so that changes in the temperature of a fluid mass within the pipe 12 are transmitted directly through the cylindrical member 16, which forms an extension of the pipe, to the medium within the bores 22 thereby to increase or decrease the pressure within the medium.

As seen in Fig. 1, the device 14 may be a conventional temperature recording mechanism of the kind that generally includes a Bourdon tube 50 connected, at its open, stationary end, to the capillary tube 36 and, at its other free or movable end, to a linkage 52 which swings an inking stylus or pen 54 across a record sheet 56 in response to deflection of the Bourdon tube resulting from changes of the pressure of the temperature responsive medium filling the bores 22, groove 26, capillary 36 and Bourdon tube 50. The record sheet or card 56 may be circular, as shown, and rotated about its center by a suitable clockwork mechanism so that the line applied to the record sheet by the stylus 54 will represent the temperature within the pipe 12 as a function of time.

It is apparent that the temperature sensing device 10 in no way interferes with, or obstructs, the flow between the pipe sections 12a and 12b, and that the interior surface contacting the fluid mass is smooth and unbroken, while any temperature change in the fluid mass within the pipe 12 is communicated directly through the member 16, which forms an extension of the pipe, to the temperature responsive medium. Further, although the welded together cylindrical member 16 and ring member 28 can be removed, as a unit, from between the pipe sections 12a and 12b, it is impossible to falsify the record of the temperature of a fluid mass flowing through the pipe 12 since the removal of the members 16 and 28 interrupts the continuity between the pipe sections 12a and 12b. The above features of the device 10 are particularly advantageous when applied to milk pasteurizing apparatus, for example, of the "high temperature-short time" type, in which the pipe 12 may be the usual "holding" tube of such apparatus. Since flow through the pipe 12 can occur only with the temperature sensing device 10 in place to provide a connection between the pipe sections 12a and 12b, any record made by the stylus 54 on the card 56 must truly represent the actual temperatures of the milk in the "holding" tube. Since the device 10 does not, in any way, obstruct flow through the pipe 12, the latter and the other parts of the pipe system (not shown) can be cleaned by conventional "in place" cleaning methods which involve the circulation of cleaning and sterilizing solutions and scrubbing sponges through the system. In connection with such "in place" cleaning of the pipe system, it should be noted that the device 10, by remaining in place during the cleaning operation, makes it possible to record the temperatures of the cleaning and sterilizing solutions, such temperatures being critical, particularly with respect to the sterilization of pipe systems handling food products, for example, milk. With the usual thermometer bulbs that project radially into the pipe and must be removed for "in place" cleaning to permit passage of the scrubbing sponges, the temperatures of the cleaning and sterilizing solutions cannot be verified, and this represented the major objection raised by health authorities to the "in place" cleaning of milk pasteurizing apparatus.

Further, from the standpoint of construction, it is apparent that the blind bores 22 in the member 16 can be easily formed by a drilling operation, while the groove 26 can be cut on a lathe. Thus, the production of the device 10 embodying this invention involves no serious difficulties.

It is apparent that the variations of pressure within the volatile fluid, or other temperature responsive medium contained in the bores 22, in response to the temperature changes in the fluid mass flowing through the pipe sections 12a and 12b can be used merely to indicate the temperature, rather than to record the latter, for example, by substituting a pointer for the inking stylus 54 and a scale for the record card 56. Further, it is apparent that the capillary tube 36 could be connected to a diaphragm or bellows arrangement, in place of the Bourdon tube 50, with the diaphragm or bellows being connected to the movable contact of a switch controlling a relay circuit for actuating a valve, signal or the like. Since the present invention only relates to improvements in the temperature sensing device 10, the various devices that may be substituted for the temperature recording device 14 in association with the device 10 have not been illustrated, and the temperature recording device is to be regarded only as being illustrative of a device that may be associated with a temperature sensing device embodying the present invention.

As previously mentioned, the temperature sensing device of the present invention may take several forms; it is, therefore, to be understood that instead of the member 16 being circular in cross-section it may be oval or have any other desired cross-sectional formation, and instead of being cylindrical, it may taper toward one end whereby when interposed between two adjacent pipe sections of different diameters it will provide a smooth unobstructed continuation of the latter.

It is also to be understood that the member 16 may be semi-cylindrical in cross-section or may be flat. When a flat member is employed, it may have an externally threaded portion whereby to be screwed into a tapped opening in the wall of a container, a plurality of blind bores, corresponding to the bores 22, being drilled in the edge of the member and a groove or other means provided to effect communication between the bores. The flat member also may be provided with an integral ipple having an internal bore, such as the nipple 32 and bœ 34 (Fig. 2).

Although a particular embodiment of the invention has been described in detail and shown in the accompanying drawing, it is to be understood that the invention is not linited to that precise embodiment, and that various changes and modifications may be effected in the latter without departing from the scope or spirit of the invention as defined in the appended claims.

What is claimed is:

1. A device for sensing the temperature of a fluid mass within a tubular structure that includes successive pipe sections; said device comprising an assembly adapted to be interposed between the adjacent ends of the successive pipe sections to form a continuation of the tubular structure, said assembly including a hollow member having a spaced apart series of axial bores in the wall thereof opening at a radial face adjacent one end of said hollow member, and a communicating member disposed against said radial face, one of said members having an annular groove in the radial face thereof confronting the other of said members and intercepting the openings of said bores to communicate the latter with each other so that said bores and groove are adapted to contain a temperature responsive medium to which any changes in the temperature of a fluid mass within the tubular structure are transmitted directly through said hollow member to said medium.

2. A device for sensing the temperature of a fluid mass within a tubular structure that includes successive pipe sections of uniform interior cross-sections; said device comprising an assembly adapted to be interposed between the adjacent ends of the successive pipe sections to form a uniform and internally unobstructed continuation of the tubular structure, said assembly including a cylindrical member having a circumferentially spaced apart series of axial bores therein opening at a radial face adjacent one end of said cylindrical member, and a ring member disposed against said radial face, said radial face of the cylindrical member having an annular groove therein intercepting the open ends of said bores to establish mutual communication between the latter so that said bores and groove are adapted to contain a temperature responsive medium to which any changes in the temperature of a fluid mass within the tubular structure are directly transmitted through said cylindrical member.

3. A device for sensing the temperature of a fluid mass within a tubular structure that includes successive pipe sections of uniform interior cross-sections; said device comprising a cylindrical member adapted to be interposed between the adjacent ends of the pipe sections and having the same internal cross-sections as the latter in the region therebetween to form a uniform and internally unobstructed continuation of the tubular structure, said cylindrical member having a radially extending annular face adjacent one end thereof and a series of circumferentially spaced apart, axial bores extending from said annular face substantially throughout said region between the adjacent ends of the pipe sections, and a ring member having a radially extending annular face at least at one side thereof and secured on said cylindrical member with said annular faces of the cylindrical and ring members in abutting relationship, one of said annular faces having an annular groove therein registering with said bores to establish mutual communication between the latter so that said groove and said bores are adapted to contain a temperature responsive medium to which any changes in the temperature of a fluid mass within the tubular structure are directly transmitted through said region of the cylindrical member.

4. A device for sensing the temperature of a fluid mass within a tubular structure that includes successive pipe sections of uniform interior cross-sections; said device comprising a cylindrical member having a stepped internal and external configuration to define a relatively thick portion of substantial length and axially extending, relatively thin rims at the opposite ends of said thick portion adapted to telescope over the adjacent end portions of the pipe sections, said thick portion between said rims having the same internal configuration as the pipe sections to form a uniform and internally unobstructed continuation of the latter, said cylindrical member having a series of circumferentially spaced apart bores extending axially therein substantially throughout the length of said thick portion and opening at one end of the latter radially outside of the adjacent thin rim, and a ring member abutting against said one end of the thick portion and extending around said adjacent thin rim, said one end of the thick portion having means therein establishing mutual communication between said bores so that the latter together define an interior space adapted to contain a temperature responsive medium to which any changes in the temperature of a fluid mass within the tubular structures are directly transmitted through said thick portion of the cylindrical member, said device having an outlet passageway communicating with said interior space and adapted for communicating the latter with a device responsive to temperature changes in the medium contained therein.

5. A device for sensing the temperature of a fluid mass within a tubular structure that includes successive pipe sections of uniform interior cross-sections; said device comprising a cylindrical member having a stepped internal and external configuration to define a relatively thick portion of substantial length and axially extending, relatively thin rims at the opposite ends of said thick portion adapted to telescope over the adjacent end portions of the pipe sections, said thick portion between said rims having the same internal configuration as the pipe sections to form a uniform and internally unobstructed continuation of the latter, said cylindrical member having a series of circumferentially spaced apart bores extending axially therein substantially throughout the length of said thick portion and opening at one end of the latter radially outside of the adjacent thin rim, and a ring member abutting against said one end of the thick portion and extending around said adjacent thin rim, said one end of the thick portion having an annular groove therein intercepting the open ends of said axial bores to establish mutual communication between the latter so that said bores and said groove together define an interior space adapted to contain a temperature responsive medium to which any changes in the temperature of a fluid mass within the tubular structure are directly transmitted through said thick portion of the cylindrical member, said device having an outlet passageway from said interior space adapted for communicating the latter with means operable by pressure resulting from temperature changes in the medium contained therein.

6. A device for sensing the temperature of a fluid mass within a tubular structure that includes successive pipe sections; said device comprising a cylindrical member having a stepped internal configuration to define a relatively thick portion of substantial length and axially extending, relatively thin rims at the opposite ends of said thick portion adapted to telescope over the end portions of the pipe sections with internal and external radial shoulders being formed between the opposite ends of said thick portion and the adjacent thin rims, said thick portion having the same internal configuration as said pipe sections to form a uniform and internally unobstructed continuation of the latter, said cylindrical member having a series of circumferentially spaced apart blind bores extending axially therein substantially throughout the length of said thick portion and opening at the external radial shoulder at one end of the latter, and a ring member abutting axially against the external radial shoulder at said one end of the thick portion and extending around the adjacent rim to cover the open ends of said axial bores, said external radial shoulder at said one end of the thick portion having an annular groove therein intercepting the open ends of said bores and confined within the radial limits of said ring member to establish mutual communication between said axial bores so that said groove and said bores are adapted to contain a temperature responsive medium to which any changes in the temperature of a fluid mass within said tubular structure are directly transmitted through said thick portion.

7. A device for sensing the temperature of a fluid mass; said device comprising a tubular member through which a fluid mass can be passed, said member having a series of circumferentially spaced apart, axially extending bores therein opening at one end of said member, and means sealing the ends of said bores at said one end of the tubular member, said tubular member further having an annular groove therein intercepting all of said bores to establish mutual communication between the latter so that said groove and bores are adapted to contain a temperature responsive medium to which any changes in the temperature of a fluid mass passed through said tubular member are directly transmitted by the latter.

8. A device for sensing the temperature of a fluid mass; said device comprising a tubular member through which a fluid mass can be passed, said tubular member having a circumferentially spaced apart series of axially extending bores therein opening at one end of the tubular member, and a ring member abutting against said one end of said tubular member to close the open ends of said bores, one of said members having an annular groove therein intercepting all of said bores to establish mutual communication between the latter so that said groove and bores are adapted to contain a temperature responsive medium to which any changes in the temperature of a fluid mass passed through said tubular member are directly transmitted by the latter.

9. A device for sensing the temperature of a fluid mass; said device comprising a hollow member through which a fluid mass may be passed and having a spaced apart series of axial bores in the wall thereof opening at a radial face adjacent one end of said hollow member, and a communicating member disposed against said radial face, one of said members having an annular groove in the radial face thereof confronting the other of said members and intercepting the openings of said bores to establish communication between the latter so that said bores and groove are adapted to contain a temperature responsive medium to which any changes in the temperature of a fluid mass passed through said hollow member are directly transmitted by the latter.

References Cited in the file of this patent

UNITED STATES PATENTS

| | | |
|---|---|---|
| 242,521 | Emery | June 7, 1881 |
| 1,038,530 | Cowling | Sept. 17, 1912 |
| 1,063,349 | Hodgkinson | June 3, 1913 |
| 1,091,472 | Babendreer | Mar. 31, 1914 |
| 2,025,617 | Schramm | Dec. 24, 1935 |
| 2,712,236 | Bennett | July 5, 1955 |